April 5, 1949.　　　　R. W. CLIFFORD　　　　2,466,303
VALVE GEAR FOR THE DISTRIBUTION
VALVES OF STEAM LOCOMOTIVES
Filed Oct. 17, 1945　　　　　　　　　　　　7 Sheets-Sheet 1
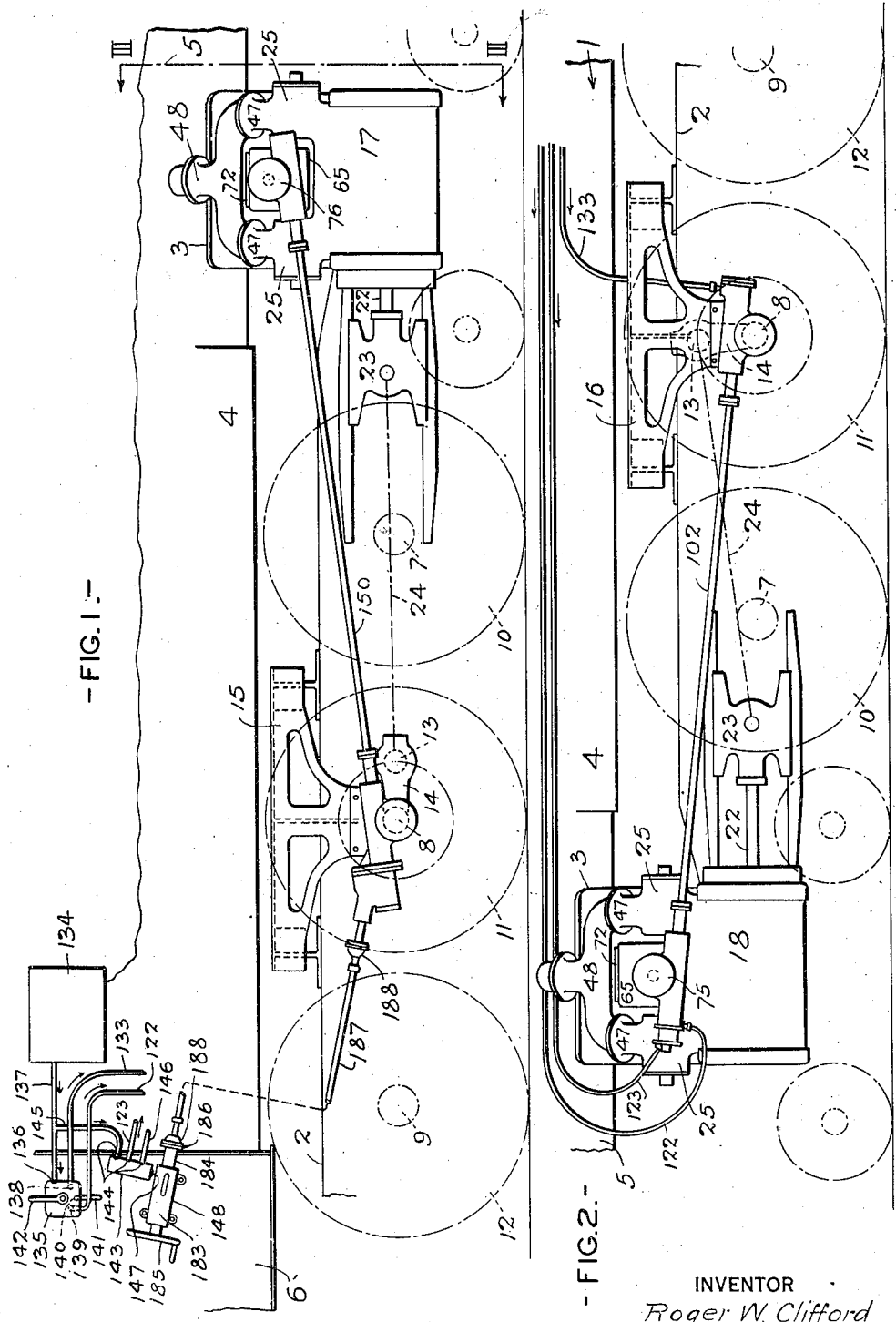
INVENTOR
Roger W. Clifford
BY
S. C. Yeaton
ATTORNEY

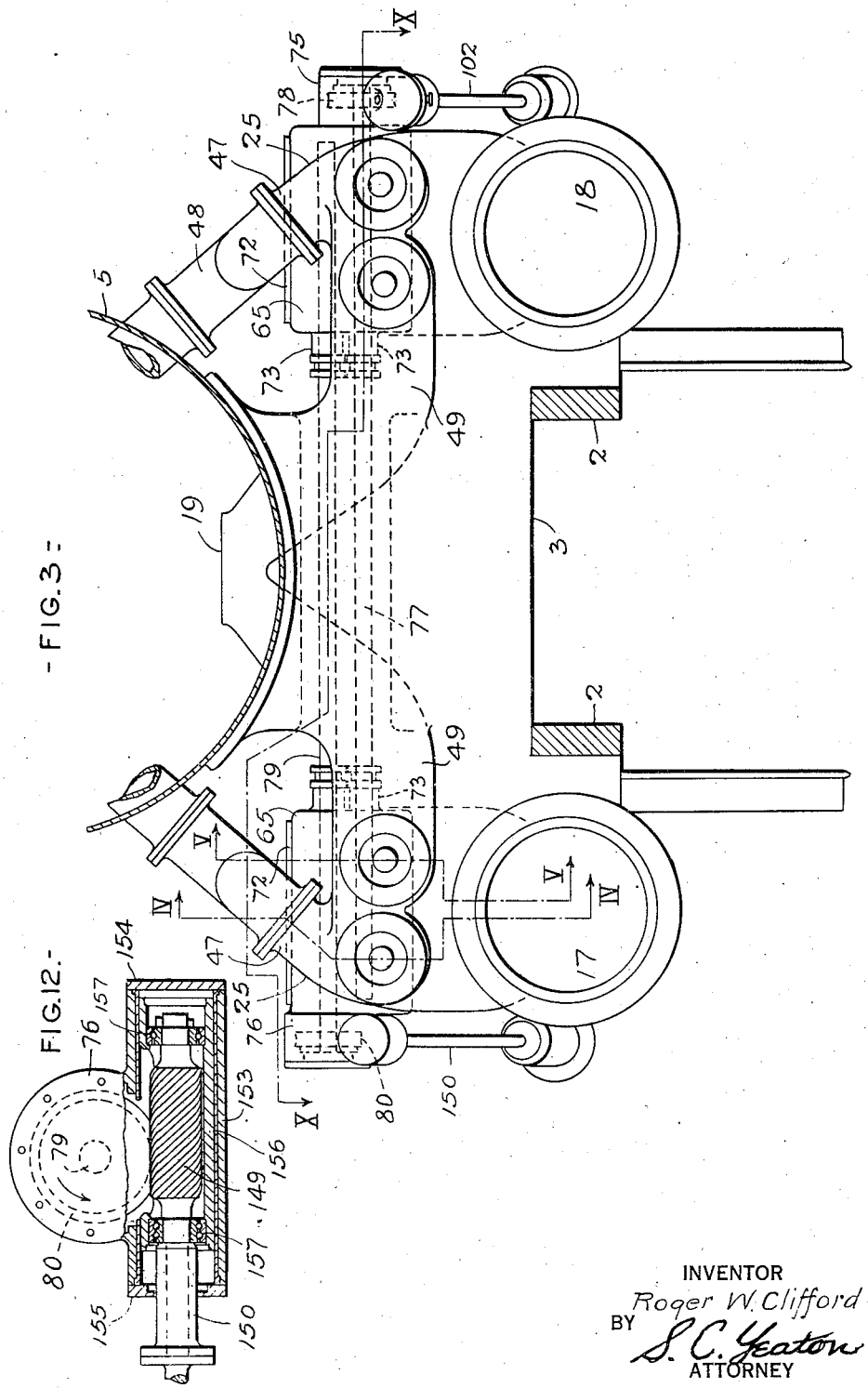

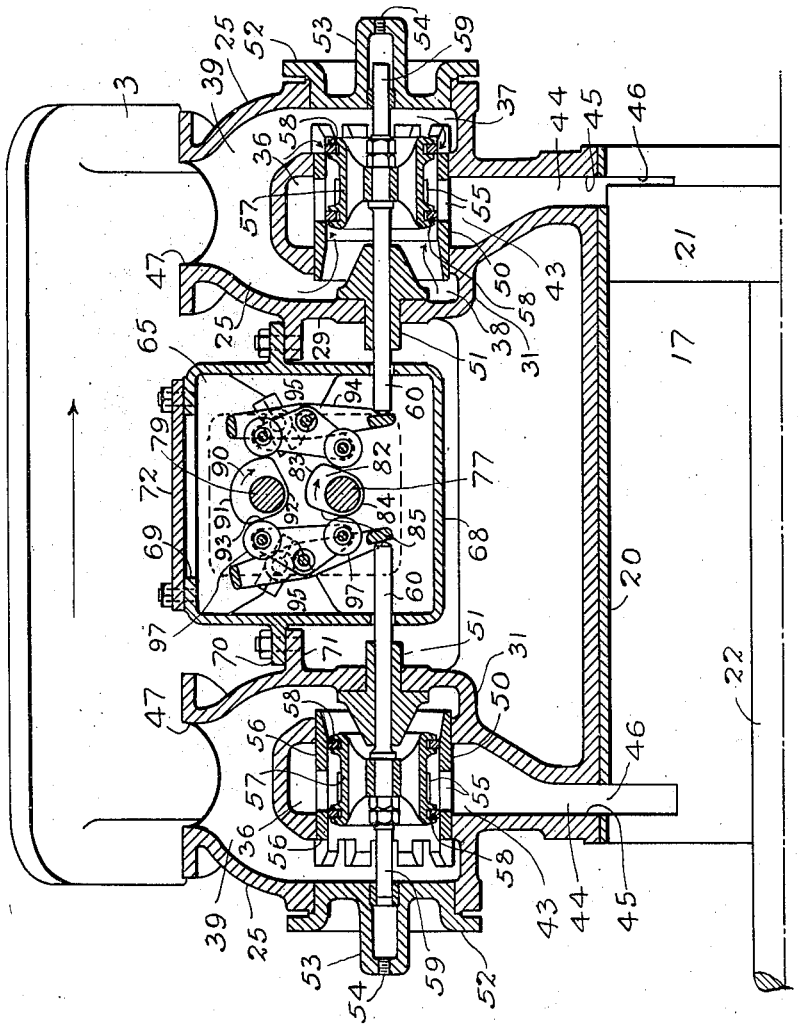
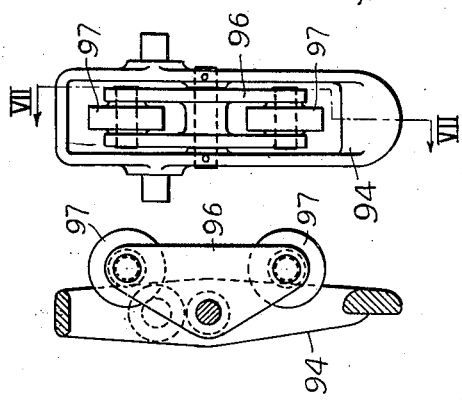

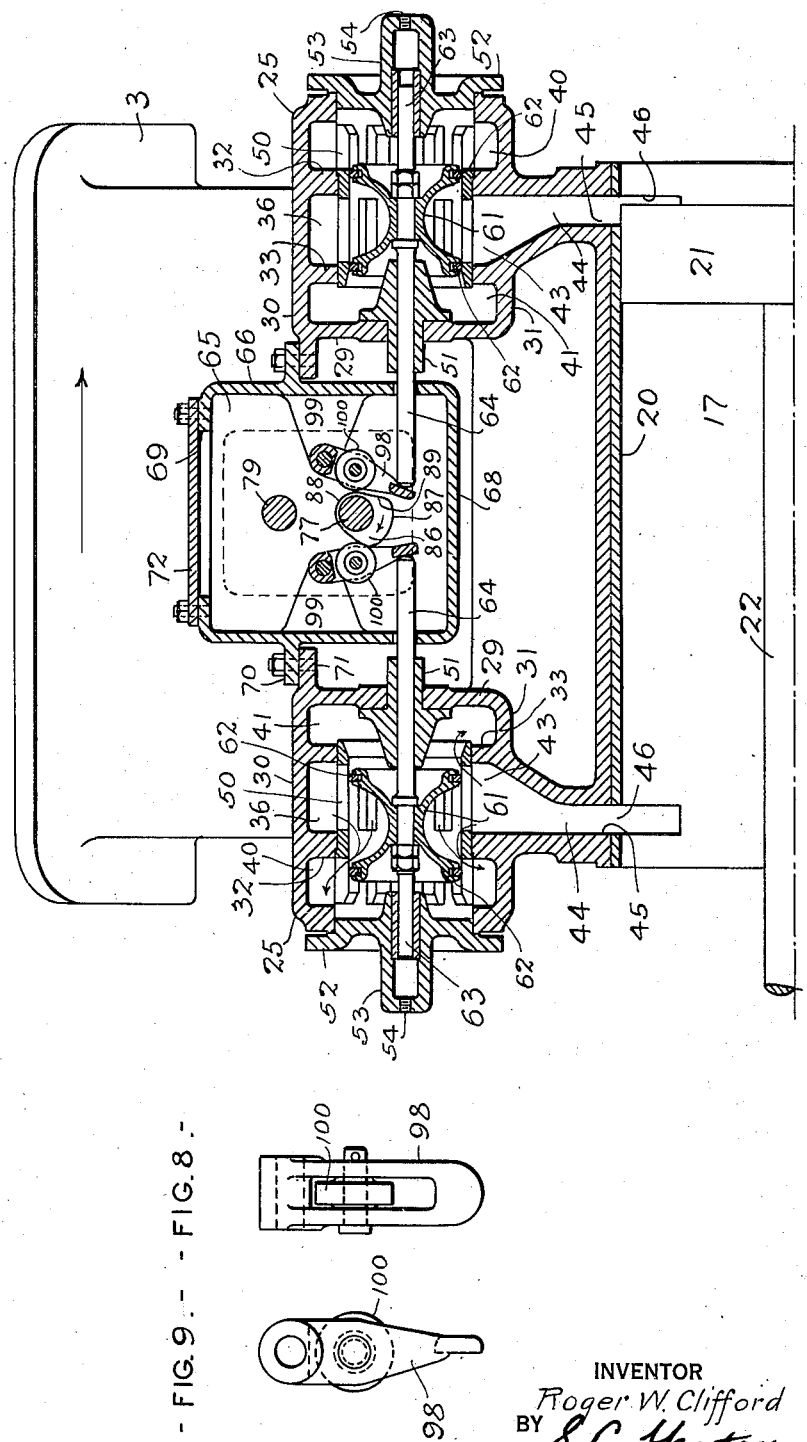

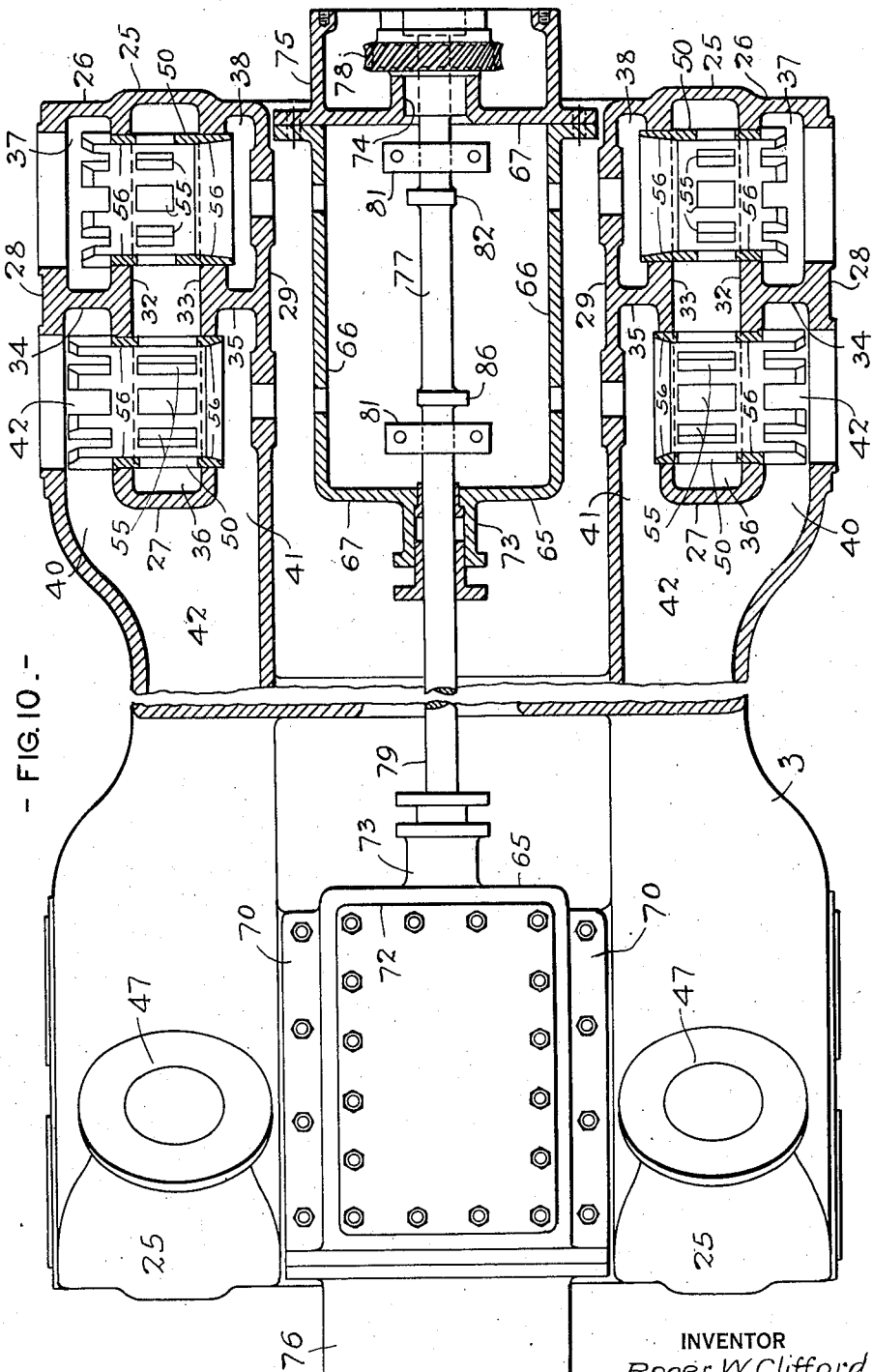

April 5, 1949.  R. W. CLIFFORD  2,466,303
VALVE GEAR FOR THE DISTRIBUTION
VALVES OF STEAM LOCOMOTIVES
Filed Oct. 17, 1945  7 Sheets-Sheet 6
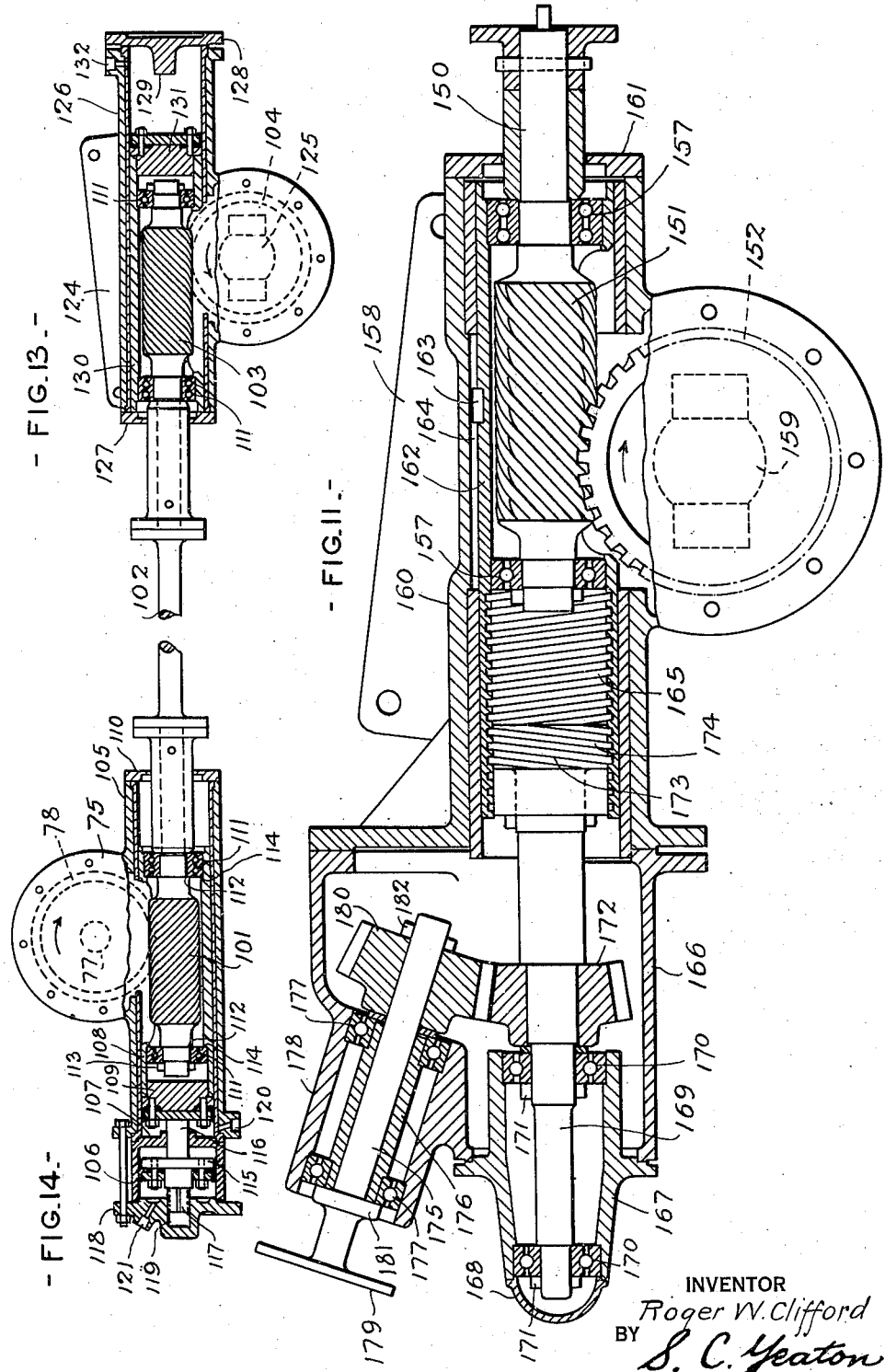
INVENTOR
*Roger W. Clifford*
BY
*S. C. Yeaton*
ATTORNEY April 5, 1949.  R. W. CLIFFORD  2,466,303
VALVE GEAR FOR THE DISTRIBUTION
VALVES OF STEAM LOCOMOTIVES
Filed Oct. 17, 1945  7 Sheets-Sheet 7
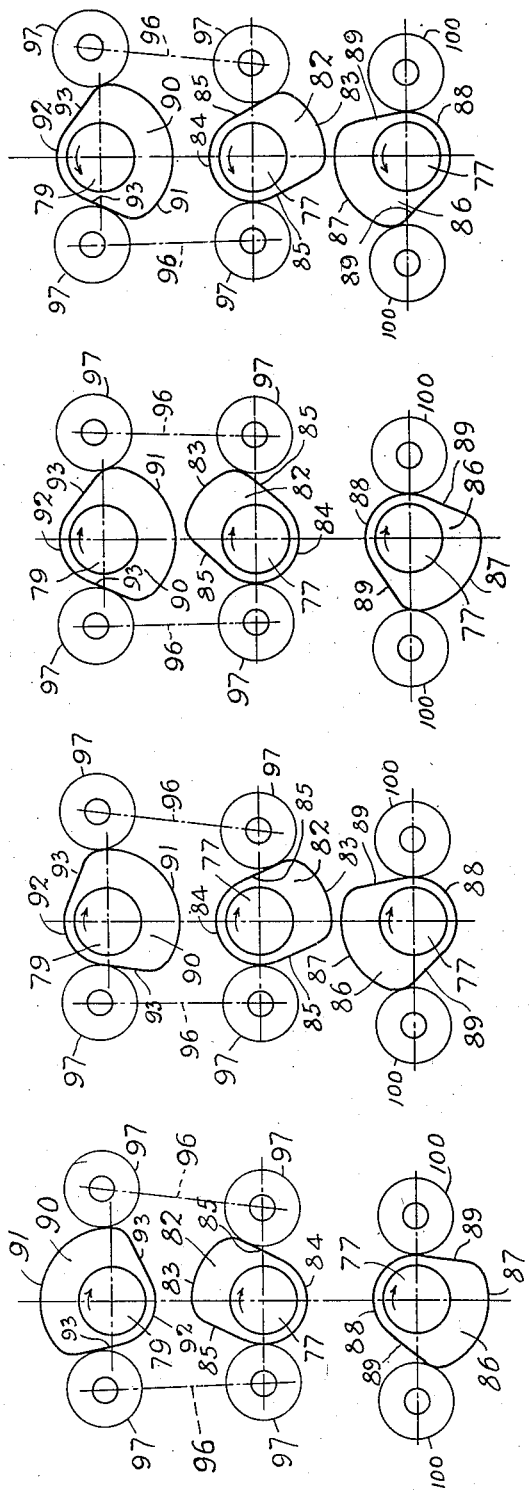
- FIG. 15. -
INVENTOR
Roger W. Clifford
BY S. C. Yeaton
ATTORNEY Patented Apr. 5, 1949

2,466,303

UNITED STATES PATENT OFFICE 2,466,303

VALVE GEAR FOR THE DISTRIBUTION VALVES OF STEAM LOCOMOTIVES

Roger W. Clifford, Schenectady, N. Y., assignor to American Locomotive Company, New York, N. Y., a corporation of New York Application October 17, 1945, Serial No. 622,767

7 Claims. (Cl. 121—127)

This invention relates to a valve gear for the distribution valves of steam locomotives, and more particularly to a valve gear for the valves of power cylinders wherein each cylinder at each end thereof has a valve for controlling steam admission and another valve for controlling steam exhaust. The valve gear is further of the type wherein two simultaneously rotatable cam shafts are employed in operating the valves and for controlling the valve events for steam distribution.

In valve gear of the aforesaid type one of the cam shafts is rotatively adjustable to vary the point of cut-off of steam, and the other cam shaft is rotatively adjustable to vary the point of admission and exhaust of steam.

An object of the invention is to provide on the admission-exhaust cam shaft an admission cam for each power cylinder adaptable, through suitable rotative adjustment of its shaft, for serving both for locomotive forward and reverse or backward movement.

Another object is to provide on the admission-exhaust cam shaft an exhaust cam for each power cylinder adaptable, through suitable rotative adjustment of its shaft, for serving both for locomotive forward and reverse or backward movements.

Another object is to provide on the admission-exhaust cam shaft an admission cam and an exhaust cam for each power cylinder adaptable, through a single suitable rotative adjustment of their shaft, for serving both for locomotive forward and reverse or backward movements.

Another object is to provide on the two shafts a set of three cams for each power cylinder, each set comprising a cam on the cut-off cam shaft and an admission cam and an exhaust cam on the admission-exhaust cam shaft. The cam surfaces of the three cams are of relative lengths to adapt them, through suitable rotative adjustment of their respective shafts, for controlling the valve events for steam distribution. The cut-off cam serves to effect all the points of cut-off of steam except that of full gear or maximum cut-off and the admission cam serves to effect all the points of admission of steam and in addition to effect the point of full gear or maximum cut-off of steam.

It should be stated that as to the just preceding object, for convenience of description, one of the shafts is termed the cut-off cam shaft even though this shaft does not control full gear or maximum cut-off of steam, and the other shaft is termed the admission-exhaust cam shaft even though it also controls full gear or maximum cut-off of steam. These terms, for convenience, will be used hereafter in describing the preferred embodiment of the invention, subject to the above understanding.

Another object is to provide a worm shaft rotatable by a locomotive driving wheel for rotating the cut-off cam shaft for serving in the opening and closing operation of the distribution valves. The worm shaft is manually movable axially with simultaneous rotative movement for rotating the cut-off cam shaft relative to the driving wheel and to the admission-exhaust cam shaft to adjust its cut-off cam for each cylinder to selected points of cut-off of steam. The worm shaft has thereon two worms, one being driven by the driving wheel through a worm wheel rotated thereby, and the other rotating the cut-off cam shaft through a worm wheel secured thereon. The worms are reversely pitched and the worm shaft is inextensible, whereby rotation of the cut-off cam shaft for its adjustment is effected by its driving worm both through its rotation and also through its axial movement. This advantageously provides maximum adjustment rotation of the cut-off cam shaft for minimum axial movement of the worm shaft.

Another object is to provide a worm shaft rotatable by a locomotive driving wheel for rotating the admission-exhaust cam shaft for serving in the opening and closing operation of the distribution valves. The worm shaft is movable by fluid power axially with simultaneous rotative movement for rotating the admission-exhaust cam shaft relative to the driving wheel and to the cut-off cam shaft to simultaneously adjust its admission cam and exhaust cam for each cylinder to selected points of admission and corresponding points of exhaust of steam and for reversing the movement of the locomotive. Ordinarily, change in the point of admission will not be necessary except to provide for preadmission or lead. In the present invention lead is provided for only for locomotive forward movement. The worm shaft has thereon two worms, one being driven by the driving wheel through a worm wheel rotated thereby, and the other rotating the admission-exhaust cam shaft through a worm wheel secured thereon. The worms are reversely pitched and the worm shaft is inextensible, whereby rotation of the admission-exhaust cam shaft for its adjustment is effected by its driving worm both through its rotation and also through its axial movement. This advantageously provides maximum adjustment rotation of the admission-exhaust cam shaft for minimum axial movement of the worm shaft.

Another object is to provide steam admission and steam exhaust valves for the power cylinders housed each in a casing provided at its outer end with a small steam cylinder. Each valve has a stem at one end serving as a plunger operating in the small steam cylinder. In the case of the admission valves, each valve has a rocker lever rocked outwardly by the joint action of its correlated cut-off and admission cams. In the case of the exhaust valves, each valve has a rocker lever rocked outwardly by its correlated exhaust cam. Each valve has a stem at its other end engaging its rocker for movement of the valve in one direction by the outward movement of its rocker. The valve is returned by the pressure of the steam in the small steam cylinder as the cams (or cam as the case may be) in their rotation permit the rocker to rock inwardly. Thus the valve stem engaging the rocker is held in constant contact therewith and the rocker (through rollers) is held in constant contact with its cams (or cam as the case may be), all in a most simple manner and without the employment of any spring.

Another object is to provide piston valves for the power cylinders. Each valve reciprocates in a valve cylinder housed in a valve chest or casing and operating as a double valve in the sense that the steam is passed at both ends of the piston valve when open. To this end the valve casing in effect is divided into two steam passages, one at each end of the piston valve. In the case of an admission valve the live steam coming from the supply port opening of the casing passes through both admission casing passages to the power cylinder port. In the case of an exhaust valve the exhaust steam coming from the power cylinder port passes through both exhaust casing passages to the exhaust port or opening in the casing.

Other and further objects of this invention will appear from the following description, the accompanying drawings and the appended claims.

Referring to the drawings forming part of this application, Figure 1 is a diagrammatic fragmental side elevation of the right side of a steam locomotive embodying the present invention, parts being shown in dot and dash lines; Fig. 2 is a view similar to Fig. 1 of the left side of the locomotive; Fig. 3 is an enlarged section on the line III—III of Fig. 1; Fig. 4 is an enlarged section on the line IV—IV of Fig. 3; Fig. 5 is an enlarged section on the line V—V of Fig. 3; Fig. 6 is an enlarged elevation of one of the rocker levers, and its associated parts, of Fig. 4; Fig. 7 is a section on the line VII—VII of Fig. 6; Fig. 8 is an enlarged elevation of one of the rocker levers, and its associated parts, of Fig. 5; Fig. 9 is a view of Fig. 8 viewed from the left; Fig. 10 is an enlarged foreshortened section on the line X—X of Fig. 3, parts being omitted and the valve cylinders being shown in axial section; Fig. 11 is an enlarged vertical longitudinal central section, partly in full, of the rear end of the cut-off cam shaft drive; Fig. 12 is a view, similar to Fig. 11, partly in section and partly in full, of the front end of the cut-off cam shaft drive; Fig. 13 is an enlarged vertical longitudinal central section, partly in full, of the rear end of the admission-exhaust cam shaft drive; Fig. 14 is a view, similar to Fig. 13, partly in section and partly in full, of the front end of the admission-exhaust cam shaft drive; and Fig. 15 is a diagram of various positions of the cams for various distribution valve events.

Features of the invention are adaptable to engines other than to locomotive engines, and poppet valves may be employed as well as piston valves. But as the invention is especially adapted to steam locomotives and as piston valves are preferable, the invention is so illustrated in the drawings and will be so confined in the description, the scope of the appended claims being however not so limited unless so indicated.

Only sufficient of the locomotive is shown for an understanding of the invention. It is indicated generally by the reference numeral 1 and includes main side frames 2, a cylinder saddle 3, a superstructure 4 with a smoke box 5 at its front end and a cab 6 at its rear end, axles 7, 8 and 9, and pairs of driving wheels 10, 11 and 12 on the respective axles, which are connected by the usual side rods (not shown). The locomotive further includes a crank pin 13 for each of the main driving wheels 11, an arm 14, for a purpose later to be described, extending inwardly from each crank pin 13 to the axle 8, and two brackets 15 and 16, bracket 15 being at the locomotive right side, and bracket 16 being at the locomotive left side, the brackets being disposed above the main driving axle 8. The crank pins 13 are angularly disposed according to usual practice.

The saddle 3 and parts associated therewith include a right power cylinder 17, a left power cylinder 18 and the usual common exhaust opening 19 leading to the smoke stack (not shown). Each cylinder has a cylinder liner 20, a piston 21, a piston rod 22, a crosshead 23, a main rod 24 connecting the crosshead with the adjacent crank pin 13, and two valve chests 25. The chests are alike except that they are oppositely directed, one chest being at the front end of the cylinder and the other chest being at the rear end.

Each chest includes an outer end wall 26, an inner end wall 27, two side walls 28 and 29, a top wall 30, a bottom wall 31, two valve cylinder-supporting interior walls 32 and 33 spaced from each other and from the walls 28 and 29 respectively and extending from top to bottom and from end to end of the chest, and two walls 34 and 35 connecting respectively walls 28 and 32, and walls 29 and 33. Each chest is thus divided interiorly into an enclosed space or passage 36, which, as will later appear, is common to both the admission and exhaust valves, two outer spaces or passages 37 and 38 forming a compartment 39 for live steam, and two inner spaces or passages 40 and 41 forming a compartment 42 for exhaust steam.

The passage 36 communicates at its bottom, through a large opening 43 in the bottom wall 31, with a live-steam-exhaust passage 44 formed in the saddle 3. The passage 44 communicates, through a large opening 45 in the power cylinder, with a live-steam-exhaust port 46 formed in the cylinder liner 20.

The live steam compartments 39 at opposite ends of a power cylinder have each at its top a large pipe coupling 47 which is connected with one of the branches of a live steam supply pipe 48. The exhaust steam compartments 42 at each end of a cylinder are open, at their inner end walls 27, each to a steam exhaust pipe 49 which discharges the exhaust steam through the opening 19 in the usual manner.

A piston valve cylinder 50 is supported in aligned orifices in the walls 32 and 33 in each compartment with its axis parallel with the axis of the power cylinder liner 20. A bored piston valve stem guide 51 extends through an orifice in the wall 29 in each of the compartments with its axis in line with its correlated piston valve cylinder axis. A head or cover 52 closes an orifice in the wall 28 in each of the compartments. Each cover has a small steam cylinder 53 formed therein with its axis in line with its correlated piston valve cylinder axis. Each cylinder 53 has a threaded orifice 54 for a steam supply pipe (not shown) for supply of steam to the cylinder 53 from any convenient source. The piston valve cylinder is open at both ends, spans the passage 36 and extends and opens into the compartment passages adjacent thereto.

The valve cylinder is grilled at its end adjacent the cover 52 for improved steam flow. The valve cylinder is smaller circumferentially than the spaces or passages adjacent thereto thereby providing ample space for the flow of steam. The valve cylinder is open to the passage 36 through a circumferential row of ports 55, and at each side thereof the valve cylinder has a solid portion 56 tightly engaging the walls 32 and 33.

From the foregoing it will be seen that as to each valve chest live steam will flow from the pipe coupling 47 to the power cylinder through both ends of the steam admission valve cylinder, and exhaust steam will flow from the power cylinder to the exhaust pipe 49 through both ends of the steam exhaust valve cylinder. Further it will be seen that there is a steam admission and a steam exhaust valve cylinder at each end of each power cylinder. The valve cylinders at one end are each in axial alignment with the corresponding valve cylinder at the other end and all four valve cylinders have their axes parallel with the axis of the power cylinder.

There is a piston valve and its associated parts for each piston valve cylinder. These are similar except that they are in reverse positions at opposite ends of the power cylinder and further except that the steam admission valves have axial openings connecting their ends while the steam exhaust valves have not. However either type of valve may be employed as desired. Each valve has, at its opposite ends, radially extended portions provided with rings which engage the inner face of its piston valve cylinder. The valve gear is so designed that to move a valve from closed to open position it is moved toward the adjacent cover 52, conveniently termed outward movement.

Each steam admission valve 57 has the aforesaid radially extended portions 58 and is provided at its end adjacent the cover 52 with a stem or plunger 59 and at its other end with a stem 60. The stem 60 extends through the adjacent guide 51 with its end in engagement with a rocker lever (later to be described). The plunger 59 extends into the adjacent cylinder 53.

During the operation of the valve gear the rocker lever is forced to rock outwardly thereby moving the valve 57 outwardly to open position. When the rocker lever is free to rock inwardly the plunger 59, due to the pressure of the steam in cylinder 53, returns the valve to closed position, the stem 60 always remaining in contact with its rocker lever. When the admission valve 57 is closed its extended portions 58 will engage the valve cylinder solid portions 56 thereby shutting off the ports 55 and consequently the corresponding end of the power cylinder from live steam supply. When the admission valve 57 is open its outer extended portion 58 will be suitably over the grilled end of the valve cylinder and the inner extended portion 58 will be suitably over the ports 55 to permit live steam to enter ports 55 and consequently the corresponding end of the power cylinder through both ends of the valve cylinder from both passages 37 and 38.

Each steam exhaust valve 61 has the aforesaid radially extended portions 62 and is provided at its end adjacent the cover 52 with a stem or plunger 63 and at its other end with a stem 64. The valve 61, portions 62, plunger 63 and stem 64 are disposed and operated respectively in a manner similar to admission valve 57, portions 58, plunger 59 and stem 60 and no further description is deemed necessary.

A cam box 65 is disposed between the valve chests 25 of each power cylinder. Each box has side walls 66, end walls 67, a bottom wall 68 and a top wall 69. The side walls 66 have flanges 70 and the walls 29 have flanges 71. The flanges 70 rest upon and are bolted to the flanges 71, thus rigidly holding the box in place. The top wall 69 is open and a cover plate 72 is bolted thereto. The outer end wall 67 is detachably bolted to flanges on the side walls 66. The inner end wall 67 has two stuffing boxes 73 vertically aligned one above the other. The outer end wall 67 of the box for the left power cylinder has an opening 74 in line with the lower stuffing boxes 73. The opening 74 is enclosed by a gear casing 75 formed on the adjacent outer end wall 67. The outer end wall 67 of the box for the right power cylinder has an opening similar to the opening 74 in line with the upper stuffing boxes 73 and the opening is enclosed by a gear casing 76 formed on the adjacent outer end wall 67.

A rotatable steam admission-exhaust cam shaft 77 extends transversely across the locomotive, through the lower stuffing boxes 73 and into the cam boxes 65. It extends into the gear casing 75 and has secured on its end within the gear casing a worm wheel 78 for rotating the shaft.

A rotatable steam cut-off cam shaft 79 extends transversely across the locomotive, through the upper stuffing boxes 73 and into the cam boxes 65. It extends into the gear casing 76 and has secured on its end within the gear casing a worm wheel 80 for rotating the shaft.

The cam shafts 77 and 79 are journalled in bearing blocks 81 disposed in the cam boxes 65 and secured to the bottom walls 68 thereof. The shafts are journalled for rotation only, that is to say, they have no axial movement.

The lower shaft 77 has secured thereon, in each of the cam boxes 65, a steam admission cam 82 having a raised cam face 83, a low face 84, and side faces 85 connecting the raised and low faces. The stems 60 of the steam admission valves 57 of a power cylinder extend toward each other in alignment through the side walls of their adjacent cam box 65 and the admission cam 82 therein is in the vertical plane of these stems.

The lower shaft 77 also has secured thereon, in each of the cam boxes 65, a steam exhaust cam 86 having a raised cam face 87, a low face 88 and side faces 89 connecting the raised and low faces. The stems 64 of the steam exhaust valves 61 of a power cylinder extend toward each other in alignment through the sides of their adjacent cam box 65 and the exhaust cam 86 therein is in the vertical plane of these stems.

The upper shaft 79 has secured thereon, in each of the cam boxes 65, a steam cut-off cam 90 having a raised cam face 91, a low face 92 and side faces 93 connecting the raised and low faces. The admission cam 82 and the cut-off cam 90 in each cam box 65 are in the same vertical plane.

The cam rocker mechanism is similar in each cam box 65. Therefore but one mechanism will be described. A rocker lever 94 is disposed at each side of the pair of cam shafts 77 and 79 opposite the cams 82 and 90. Each lever is pivotally hung from a bracket 95 projecting inwardly from the adjacent side of the cam box 65. A roller support 96 is pivotally connected about midway thereof to each of the levers at a point thereon below the lever pivotal connection with its bracket, and about on a horizontal line midway between the cam shafts. The levers and supports are respectively similar except they are reversed. Each support has a cam roller 97 journalled therein at its upper and lower ends. The lower rollers engage the faces of the cam 82 and the upper rollers engage the faces of the cam 90. The lower end of each rocker lever engages the end of the valve stem 60 adjacent thereto.

A rocker lever 98 is disposed at each side of the cam shaft 77 opposite the cam 86. Each lever is pivotally hung from a bracket 99 projecting inwardly from the adjacent side of the cam box 65. Each lever has a cam roller 100 journalled therein below its pivotal connection and opposite the cam 86. The rollers engage the faces of the cam 86. The lower end of each rocker lever 98 engages the end of the valve stem 64 adjacent thereto.

The cam shafts are rotated in unison in the same direction and at the same speed by the locomotive main driving axle through a train of gears at the left side of the locomotive for the admission-exhaust cam shaft 77 and through a train of gears at the right side of the locomotive for the cut-off cam shaft 79, as will later be described.

The cam shafts make one revolution for each complete cycle of the power piston and accordingly one revolution of the driving wheels and their axles. The rotation of the cam shafts is clockwise as viewed in Figs. 4 and 5 for locomotive forward movement, but will be counter-clockwise for locomotive backward or reverse movement.

Referring more particularly to Fig. 4, each steam admission valve is moved outwardly (port opening direction) by its rocker lever 94 when it is rocked outwardly against a cushion of steam in cylinder 53. The outward rock of the lever is effected by its revolving cams and the engaging rollers, which latter roll upon the cam faces from the low to the raised faces, the valve being fully open when both rollers are riding upon their raised cam faces. The inward movement (port-closing direction) is effected by the steam pressure in cylinder 53 acting on plunger 59. This is effective only when the rollers are leaving the raised cam faces and are riding towards and upon the cam low faces which permits gradual inward rock of the lever. Full port-closing is effected when one of the rollers rides upon its cam low face, and full valve movement in a closing direction is effected when both rollers are riding upon their cam low faces.

From the foregoing it will be seen that the stems 60 are constantly in engagement with their levers and the rollers are constantly in engagement with their cams thereby obtaining a smooth valve movement in both directions. The admission valves at the opposite ends of a power cylinder operate in a similar manner except with different timing, according to usual practice.

The raised face of the admission cam 82 is of a shorter length than that of the cut-off cam 90. The roller of the cut-off cam always reaches its raised cam face first. Subsequently thereto the roller of the admission cam reaches its raised cam face thereby admitting steam to the power cylinder. Thus cam 82 is termed a steam admission cam. When the cut-off cam is adjusted for full gear cut-off (longest cut-off) the roller of the admission cam will leave its raised cam face first thereby effecting cut-off. Thus cam 82 is always the admission cam and also the cut-off cam for full gear cut-off. Cam 90 is the cut-off cam for all other cut-offs, and in each such instance the roller of the cut-off cam leaves its raised cam face before the roller of the admission cam leaves its raised cam face, thereby effecting the other various cut-offs.

Referring more particularly to Fig. 5, each exhaust valve operates similarly to the admission valves and no detailed description is therefore deemed necessary. For each of the power cylinders there is only one exhaust cam 86. This is secured on the admission-exhaust cam shaft 77. There is accordingly only one roller for each rocker lever 98. The exhaust cam 86 (Fig. 5) is secured on its cam shaft angularly relative to its companion admission cam 82 (Fig. 4) so that the exhaust valve at each end of a power cylinder opens and closes in the reverse order to that of its adjacent admission valve and in the same order as the admission valve at the opposite end of the power cylinder. The exact timing of the opening and closing of an exhaust valve will depend upon the angular position of the exhaust cam and the length of its raised cam face.

Figs. 4 and 5 show the same position for the cam shafts, this position being for locomotive forward motion, full gear, no lead, crank of power piston on front dead center. Here the admission valve at the right (front) is just about to open and its adjacent exhaust valve is closed, while at the left the admission valve is closed and its adjacent exhaust valve is open.

It has been stated that the cam mechanisms in the two cam boxes 65 are similar. The corresponding cams are set, however, at different angles according to the angle setting of their driving axle crank pins 13 required for proper timing of the power piston movements in accordance with usual practice.

The gear train at the left of the locomotive for rotating the admission-exhaust cam shaft 77 by the locomotive main driving axle 8 and the parts associated with the train of gears include the worm wheel 78 secured to the shaft 77 in gear casing 75 (see particularly Figs. 13 and 14), a worm 101 below and in mesh with worm wheel 78, a rotatable shaft 102 extending rearwardly from worm 101, a worm 103 on the rear end of shaft 102 reversely pitched as to worm 101, and a worm wheel 104 below and in mesh with worm 103. The worms 101 and 103 are formed on the shaft 102 and the shaft 102 is inextensible.

The casing 75 includes a cylinder 105 at the forward end of which is a shorter cylinder 106, the cylinders being separated by an orificed wall 107. A reciprocable tubular plunger 108 having a forward head 109 is disposed in cylinder 105. The cylinder 105 has an orificed head 110 at its rear end. The shaft 102 at its forward end extends through this orifice and the worm 101 is mounted in the plunger 108 by ball bearings 111. The worm 101, and consequently the shaft 102, are held against longitudinal movement in the plunger 108 relative to the ball bearings by shoulders 112 formed on the shaft 102 and a key 113 in the forward end of the shaft. The ball bearings are held against axial movement by shoulders 114 formed on the plunger 108. The plunger and cylinder are orificed to permit intermeshing of the worm 101 and worm wheel 78.

A reciprocable piston 115 is housed in the cylinder 106. It has a rear piston rod 116 extending through the orifice in wall 107 into the forward end of cylinder 105. It has a fluted piston rod 117 extending from its forward end. The cylinder 106 has a forward head 118 provided with a small guide 119 in which the rod 117 extends. The cylinder 105 at its forward end has a pipe coupling orifice 120 and the head 118 has a pipe coupling orifice 121, the couplings being connected respectively with power fluid pipes 122 and 123 extending rearwardly of the locomotive (see Fig. 2).

A gear casing 124 is disposed at the rear end of shaft 102 and is bolted to bracket 16. The worm wheel 104 is housed in casing 124 on the inner end of the adjacent arm 14 concentric with the driving axle 8 by a flexible coupling 125 of usual construction to permit the axle to tilt under service conditions in the usual manner.

A cylinder 126 forms part of the casing 124. It has a forward orificed head 127 and a rear head 128 provided with a stop lug 129. A reciprocable tubular plunger 130 having a rear head 131 is disposed in the cylinder 126. The shaft 102 at its rear end extends through the orifice in the head 127 and the worm 103 is mounted in the plunger 130 by other ball bearings 111. The worm 103, and consequently the shaft 102 are held against longitudinal movement in the plunger 130 relative to the ball bearings by shoulders and a key, and the ball bearings are held against axial movement by shoulders in the plunger 130, all in a manner similar to that already described in connection with the worm 101 and plunger 108. Likewise the plunger 130 and cylinder 126 are orificed to permit intermeshing of the worm 103 and worm wheel 104.

The cylinder 126 at its rear end has a pipe coupling orifice 132, the coupling being connected with a power fluid pipe 133 extending rearwardly of the locomotive (see Fig. 2). Any suitable power fluid may be provided for pipes 122, 123 and 133, such as air, steam or a hydraulic fluid. In the instant case, by way of example, the fluid will be assumed to be compressed air.

Forward of the cab 6 is a compressed air supply tank 134 connected for supply of compressed air from any source in the locomotive by a connection (not shown). Within the cab is a valve casing 135 having an inlet port 136 to which is connected a compressed air pipe 137 also connected to the supply tank 134 for supply of air to the casing. The casing has an outlet port 138 to which is connected the compressed air pipe 133, another outlet port 139 to which is connected the compressed air pipe 122, an exhaust port 140 to which is connected an exhaust pipe 141, a rotatable valve element (not shown) selectively connecting ports 138 and 139 with the supply port 136 and with the exhaust port 140 so that when compressed air is supplied to the pipe 133 it will be exhausted from pipe 122, and vice versa. The valve element is operated by a hand lever 142.

Within the cab and below the valve casing 135 is another valve casing 143 for a reciprocable piston valve (not shown). Casing 143 has three ports 144. The uppermost port is an inlet port and is connected with a compressed air pipe 145 which is connected with pipe 137 for supply of compressed air to the casing 143. The intermediate port is an outlet port and is connected with pipe 123, and the lowermost port is an outlet port and is connected with an exhaust pipe 146. Extending through the bottom wall of the valve casing 143 is a piston rod 147 extending from the aforementioned piston valve (not shown). Below the casing 143 is a hand operated device 148 which effects adjustment of the cut-off cam shaft 79, as will later be described. It also effects operation of the piston rod 147.

The valve device having the hand lever 142, the valve device having the piston rod 147, the device 148 and the flexible coupling 125 with its arm 14 are all well-known pieces of apparatus and form, in and of themselves, no part of the present invention. For a fuller understanding of their parts and their operation reference is made to the patent to the present applicant, No. 2,135,032, November 1, 1938, see particularly Fig. 27, Figs. 21 through 24, Figs. 13 through 16 and Fig. 19.

The operation of the mechanism including the train of gears and their associated parts at the left of the locomotive is as follows, referring more particularly to Figs. 13 and 14:

The driving axle 8 drives the admission-exhaust cam shaft 77 by the train of worms and worm wheels as has already been explained, the admission-exhaust cam shaft making one revolution for each revolution of the axle. This mechanism is also for reversing the locomotive from forward motion to backward motion and vice versa. This is accomplished by moving the shaft 102 longitudinally. During this movement the shaft, with its worms, will rotate due to the angularity of the teeth on worm 103. The longitudinal movement forces the worm 103 to rotate in mesh with worm wheel 104 and relative thereto. The longitudinal movement of shaft 102 causes the worm 101 to rotate its worm wheel 78 and the rotation of the shaft 102 causes the worm 101 to further rotate its worm wheel 78 due to the reverse direction of the pitch of the worms 101 and 103. Thus is provided the maximum rotation of the admission-exhaust cam shaft 77 for minimum longitudinal movement of shaft 102.

The position of the parts as shown in Figs. 13 and 14 is that for locomotive forward movement. To obtain this position it is assumed that compressed air was supplied through orifice 132 to the rear end of cylinder 126 and, simultaneously therewith, that compressed air was exhausted through orifice 120. This movement is checked, as shown, by plunger 130 coming into contact with head 127. To reverse the locomotive compressed air is supplied through orifice 120 and, simultaneously therewith, compressed air is exhausted through orifice 132. This reversal movement is checked by head 131 coming into contact with stop lug 129. Thus locomotive reversal from forward to backward movement, and vice versa, is accomplished by merely giving the admission-exhaust cam shaft 77 a partial rotation relative to the driving axle 8 to shift the positions of the admission and exhaust cams, as will later more fully appear.

The mechanism provides for preadmission or lead but for forward motion only. To this end compressed air is supplied through orifice 121 to cylinder 106 which forces piston 115 and piston rod 116 rearwardly so that head 127 does not serve as a stop, but rather the end of piston rod 116 engaging with head 109 serves as a stop and there will be a corresponding space between the head 127 and plunger 130. In other words the admission valve and exhaust valve will assume a different position relative to the driving axle 8, that is to say a position of lead or preadmission, which is assumed in the present instance as being about 15% lead or preadmission. In practice the cross-sectional area of cylinder 106 should be somewhat greater than that of cylinder 105, and is so shown, or other means should be resorted to to provide an increased pressure in cylinder 106. As already mentioned the adjusting movements for shaft 102 are under the control of the engineer through the devices in the cab.

It will be seen from the above that the admission-exhaust cam shaft has but a single admission cam and exhaust cam for each power cylinder and that all that is necessary to reverse the engine is to rotate this shaft and accordingly its cams an appropriate amount relative to the driving wheel to effect reversal of the locomotive.

The gear train at the right of the locomotive for rotating the cut-off cam shaft 79 by the locomotive main driving axle 8 and the parts associated with the train of gears are best shown in Figs. 11 and 12 and include the worm wheel 80 secured to the shaft 79 in gear casing 76, worm 149 below and in mesh with worm wheel 80, a rotatable shaft 150 extending rearwardly from worm 149, a worm 151 on the rear end of shaft 150 reversely pitched as to worm 149, and a worm wheel 152 below and in mesh with worm 151. The worms 149 and 151 are formed on the shaft 150 and the shaft 150 is inextensible.

The casing 76 includes a cylinder 153. The cylinder has a forward head 154 and an orificed rear head 155. A reciprocable tubular sleeve 156 is disposed in cylinder 153. The shaft 150 at its forward end extends through the orifice in the head 155 and the worm 149 is mounted in sleeve 156 by ball bearings 157. The worm 149, and consequently the shaft 150, are held against longitudinal movement in the sleeve 156 relative to the ball bearings by shoulders and a key, and the ball bearings are held against axial movement by shoulders in the sleeve 156, all in a manner similar to that already described in connection with worm 101 and plunger 108. Likewise the sleeve 156 and cylinder 153 are orificed to permit intermeshing of the worm 149 and worm wheel 80.

A gear casing 158 is disposed at the rear end of shaft 150 and is bolted to bracket 15. The worm wheel 152 is housed in the casing 158 and connected to the inner end of the adjacent arm 14 concentric with the driving axle 8, by a flexible coupling 159 similar to that of, and for the same purpose as, the flexible coupling 125.

A cylinder 160 forms part of the casing 158. It has a forward orificed head 161. A reciprocable tubular sleeve 162 is disposed in the cylinder 160. The shaft 150 at its rear end extends through the orifice in the head 161 and the worm 151 is mounted in the sleeve 162 by other ball bearings 157. The worm 151, and consequently the shaft 150, are held against longitudinal movement in the sleeve 162 relative to the ball bearings by shoulders and a key, and the ball bearings are held against axial movement by shoulders in the sleeve 162, all in a similar manner to that already described in connection with worm 149 and sleeve 156. Likewise the sleeve 162 and cylinder 160 are orificed to permit intermeshing of the worm 151 and worm wheel 152.

The two plungers 108 and 130 and the two sleeves 156 and 162 reciprocate but do not rotate. They are held against rotation by a key in the plunger or sleeve, as the case may be, and a keyway in the cylinder, the key 163 and the keyway 164 being shown in Fig. 11 for the sleeve 162 and cylinder 160.

The sleeve 162 to the rear of the rear ball bearings 157 has internal threads 165 and is open at its rear end. The casing 158 has a detachable part 166, at the rear end of which is a detachable shaft support 167, at the rear end of which is a detachable cap or cover 168. A rotatable shaft 169 is mounted at its rear end portion in ball bearings 170 in the support 167. The shaft 169 is held against axial movement relative to the ball bearings by shoulders on the shaft and by keys 171 and the ball bearings are held in place by shoulders formed in the support 167. A bevelled gear 172 is secured on shaft 169 just forward of the forward ball bearing 170. A wheel 173 having external threads 174 is secured on the front end of shaft 169 and threaded in the internal threads 165 of sleeve 162.

A rotatable shaft 175 having a sleeve 176 secured thereon is mounted in ball bearings 177 in an extension 178 of the detachable part 166. The shaft 175 is held against axial movement relative to the ball bearings 177 by shoulders formed on the sleeve 176 and shaft 175 and the ball bearings are held in place by shoulders formed in the extension 178. The shaft 175 has a shaft coupling 179 at its rear end and a bevelled gear 180 secured on its front end portion and in mesh with gear 172. The shaft 175 is held against axial movement by a collar 181 formed on its rear end portion, the collar providing one of the aforesaid shoulders, and a key 182 at its forward end forwardly of gear 180.

The aforementioned device 148 located in the cab 6 has a casing 183 and a rotatable shaft 184 extending through both ends of the casing. A hand wheel 185 is secured to the rear end of shaft 184 and a shaft coupling 186 is secured to the shaft 184 at its front end. As before mentioned, for a fuller understanding of the device 148 reference may be had to the aforementioned Patent No. 2,135,032 (Figs. 21 through 24). A shaft 187 connects shaft 175 with shaft 184 by universal joints 188 of usual construction connected to the shaft couplings 179 and 186.

The operation of the mechanism, including the train of gears and their associated parts at the right of the locomotive is as follows, referring more particularly to Figs. 11 and 12: The driving axle 8 drives the cut-off cam shaft 79 by the train of worms and worm wheels as has already been explained, the cut-off cam shaft making one revolution for each revolution of the axle.

This mechanism is also for changing the points of cut-off. This is accomplished by moving the shaft 150 longitudinally. During this movement the shaft, with its worms, will rotate due to the angularity of the teeth of the worm 151. The longitudinal movement forces the worm 151 to rotate in mesh with worm wheel 152 and relative thereto. The longitudinal movement of shaft 150 causes the worm 149 to rotate its worm wheel 80 and the rotation of the shaft causes the worm 149 to further rotate its worm wheel 80 due to the reverse direction of the pitch of the worms 149 and 151. Thus is provided maximum rotation of the cut-off cam shaft 79 for minimum longitudinal movement of shaft 150.

The position of the parts as shown in Figs. 11 and 12 is that for full gear or maximum cut-off, which is accomplished by the admission cam 82 as aforesaid. The sleeves 162 and 156 move with their respective worms 151 and 149 during their longitudinal movements to vary the cut-off, the sleeve 162 being effective in producing this movement.

By turning the hand wheel 185 in one direction or the other the wheel 173 is turned accordingly through the connecting mechanism already described in an obvious manner. The turning of the wheel 173, through the engagement of its threads 174 with the threads 165, effects the aforesaid longitudinal movement of the sleeve 162 forwardly or rearwardly as the case may be. Provision is made at the device 148 for the operator of the hand wheel 185 to adjust the gear to the desired points of cut-off and to effect preadmission for forward motion if desired.

Fig. 15 shows the three cams for each power cylinder in engagement with their respective rollers for various valve events. The three cams are arranged in vertical rows and each row illustrates a different valve event, there being four such events. There are but two cam shafts, the cut-off cam shaft 79 and the admission-exhaust cam shaft 77 beneath cam shaft 79. On the cam shaft 79 is the cut-off cam 90 in engagement with its rollers 97 and on the cam shaft 77 is the admission cam 82 in engagement with its rollers 97. As the exhaust cam is on the cam shaft 77, this cam shaft in Fig. 15 is repeated at the bottom so that the exhaust cam 86 and its rollers 100 may be clearly seen.

The cam shafts of the first three vertical rows, as indicated by the arrows, are rotated clockwise for locomotive forward movement. The cam shafts of the fourth vertical row are rotated counter-clockwise for locomotive reverse or backward movement.

The upper two rollers and the lower roller at the left of the cam shafts operate respectively the admission valve and exhaust valve at one end of the power cylinder, and the upper two rollers and the lower roller at the right of the cam shafts operate respectively the admission valve and exhaust valve at the other end of the power cylinder.

The cams in the first vertical row are in angular positions to position their rollers so that the admission and exhaust valves at one end of the power cylinder are respectively closed by the upper two rollers and opened by the lower roller at the left of the shafts, and so that the admission and exhaust valves at the other end of the power cylinder are, respectively, about to open by the upper two rollers and closed by the lower roller at the right of the shafts.

The cams are at positions for forward movement, full gear, no lead, locomotive engine crank on front dead center. In this position of the cut-off cam 90 the admission cam 82 will also serve as the long cut-off cam as its raised face 83 will leave its roller 97 at the right before the raised face 91 of the cam 90 leaves its roller 97 at the right. The raised face 91 always engages its roller 97 before the raised face 83 engages its corresponding roller 97. Therefore cam 82 always serves as the admission cam.

The cams in the second vertical row are in the same relative angular positions as in the first vertical row but in the normal rotation of their shafts they have reached the position for locomotive engine crank at front cut-off. Here the cam face 91 is in engagement with its roller 97 at the right while the cam face 83 has left its roller 97 at the right thereby effecting cut-off.

The cams in the third vertical row are in different relative angular positions than those in the first two rows. These positions are for forward movement short cut-off, approximately 5%, and for lead or preadmission, approximately 15%, the crank being on front dead center similar to the first vertical row. Here the raised face 83 of cam 82, which is not now acting as a cut-off cam, is about to engage its roller 97 at the right and the raised face 91 of cam 90, which is now acting as the cut-off cam, is about to leave its roller 97 at the right to effect the 5% cut-off. For this setting of the cams the cam 90 has been angularly shifted or adjusted for the short cut-off and the cams 82 and 86 have been angularly shifted or adjusted for the preadmission or lead.

The cams in the fourth vertical row have the same angular positions relative to each other as the cams in the first row, but are for reverse or backward movement, full gear, no lead, with the crank on front dead center. The cam 90 is in the same position as the cam 90 of the third row. The cams 82 and 86 have been angularly shifted or adjusted to effect the reverse or backward movement of the locomotive. Here again in this position the cam 82 acts as the cut-off cam for full gear or maximum cut-off.

While there has been herein described an approved embodiment of this invention, it will be understood that many and various changes and modification in form, arrangement of parts and detail of construction may be made thereto without departing from the spirit of the invention, and that all such changes and modifications as fall within the scope of the appended claims are contemplated as a part of this invention.

The invention claimed and desired to be secured by Letters Patent is:

1. A steam engine comprising two distribution valve-controlling rotary cam shafts; a cut-off cam on one of said shafts; another cam on the other of said shafts; and means for rotating said cut-off cam shaft relative to said other cam shaft to change the point of cut-off of steam, said cut-off cam having a cam face sufficiently longer than the cam face of said other cam, and said cams cooperating and being angularly disposed so that said other cam controls both admission and cut-off at one of its angular positions relative to said cut-off cam and controls admission only at other of its angular positions relative to said cut-off cam.

2. A steam engine comprising two distribution valve-controlling rotary cam shafts; a cut-off cam on one of said shafts; another cam on the other of said shafts; means for rotating said cut-off cam shaft relative to said other cam shaft to change the point of cut-off of steam, said cut-off cam having a longer cam face than said other cam and said cams cooperating and being angularly disposed so that said other cam controls both admission and cut-off at one of its angular positions relative to said cut-off cam and controls admission only at other of its angular positions relative to said cut-off cam; and means for rotating said other cam shaft relative to said cut-off cam shaft to change the point of admission of steam.

3. A multi-cylinder steam engine comprising two distribution valve-controlling rotary cam shafts; a set of three cams on said shafts for each cylinder, each set including a cut-off cam on one of said shafts, another cam on the other of said shafts and an exhaust cam on said other shaft; and means for rotating said cut-off cam shaft relative to said other cam shaft to change the point of cut-off of steam, said cut-off cam having a cam face sufficiently longer than the cam face of said other cam, and said cut-off cam and other cam cooperating and being angularly disposed so that said other cam controls both admission and cut-off at one of its angular positions relative to said cut-off cam and controls admission only at other of its angular positions relative to said cut-off cam.

4. A multi-cylinder steam engine comprising two distribution valve-controlling axially immovable rotary cam shafts; a set of three cams on said shafts for each cylinder, each set including a cut-off cam on one of said shafts, another cam on the other of said shafts and an exhaust cam on said other shaft; means for rotating said cut-off cam shaft relative to said other cam shaft to change the point of cut-off of steam, said cut-off cam having a longer cam face than said other cam and said cut-off cam and other cam cooperating and being angularly disposed so that said other cam controls both admission and cut-off at one of its angular positions relative to said cut-off cam and controls admission only at other of its angular positions relative to said cut-off cam; and means for rotating said other cam shaft relative to said cut-off cam shaft to change the point of admission of steam.

5. In a steam locomotive, the combination of driving wheels; a steam power cylinder having a port; a piston for said cylinder; a valve controlling the admission of steam to said port; a shaft having a cam secured thereon operating as the admission cam and as the full-gear cut-off cam; another shaft having a cut-off cam secured thereon, said cut-off cam having a cam face sufficiently longer than the cam face of said first mentioned cam so that said cut-off cam operates as the cut-off cam for all but full-gear cut-off; means for rotating said shafts in unison operably dependent upon the rotation of said driving wheels; means for rotating said cut-off cam shaft independently of the rotation of said first mentioned cam shaft to adjust the phase of said cut-off cam relative to said first mentioned cam to vary the point of cut-off of steam; and means connecting said valve with said cams for joint operation thereby including an element operably engaging said first mentioned cam and another element operably engaging said cut-off cam.

6. In a steam locomotive, the combination of driving wheels; a steam power cylinder having a port; a piston for said cylinders; a valve controlling the admission of steam to said port; a shaft having a cam secured thereon operating as the admission cam and as the full-gear cut-off cam; another shaft having a cut-off cam secured thereon operating as the cut-off cam for all but full-gear cut-off, said cut-off cam having a longer cam face than said first mentioned cam; means for rotating said shafts in unison operably dependent upon the rotation of said driving wheels; means for rotating said cut-off cam shaft independently of the rotation of said first mentioned cam shaft to adjust the phase of said cut-off cam relative to said first mentioned cam to vary the point of cut-off of steam; means for rotating said first mentioned cam shaft independently of the rotation of said cut-off cam shaft to adjust the phase of said first mentioned cam relative to said cut-off cam to vary the point of steam admission; and means connecting said valve with said cams for joint operation thereby including an element operably engaging said first mentioned cam and another element operably engaging said cut-off cam.

7. In a steam locomotive, the combination of driving wheels; a steam power cylinder having a port; a piston for said cylinder; a valve controlling the admission of steam to said port; a shaft having a cam secured thereon operating as the admission cam; another shaft having a cut-off cam secured thereon; separate worm drive means for rotating said shafts, each including a worm wheel operably dependent for rotation upon the rotation of said driving wheels, a worm wheel on its correlated cam shaft, reversely pitched worms coacting one with each of said worm wheels, and a shaft connecting said worms, said admission cam shaft drive further including a power fluid cylinder at its forward end portion for moving its worms and connecting shaft axially as a unit rearwardly to reverse the locomotive, a power fluid cylinder at its rearward end for moving its said worms and connecting shaft axially as a unit forwardly to restore said locomotive to forward motion, and a power fluid cylinder forwardly of said forward end portion power fluid cylinder for moving its said worms and connecting shaft axially as a unit rearwardly a short distance to provide preadmission of steam; and means connecting said valve with said cams for joint operation thereby including an element operably engaging said admission cam and another element operably engaging said cut-off cam.

ROGER W. CLIFFORD.

REFERENCES CITED

The following references are of record in the file of this patent:

UNITED STATES PATENTS

| Number | Name | Date |
|---|---|---|
| 805,562 | Lamplough | Nov. 28, 1905 |
| 1,927,525 | Mueller | Sept. 19, 1933 |
| 2,135,032 | Clifford | Nov. 1, 1938 |
| 2,235,223 | Lentz | Mar. 18, 1941 |

FOREIGN PATENTS

| Number | Country | Date |
|---|---|---|
| 329,344 | France | May 27, 1903 |
| 17,169 | France | Apr. 25, 1913 |
|  | (Addition to No. 413,752) |  |